United States Patent [19]

Bauer et al.

[11] Patent Number: 5,383,961
[45] Date of Patent: Jan. 24, 1995

[54] WATER-SOLUBLE SULPHUR DYES, THEIR PREPARATION AND USE

[75] Inventors: Wolfgang Bauer, Maintal; Gert Nagl, Niederdorfelden; Willi Steckelberg, Hofheim/Ts; Josef Ritter, Bad Soden; Wilhelm Mauelshagen, Bad Camberg, all of Germany

[73] Assignee: Cassella AG, Frankfurt, Germany

[21] Appl. No.: 128,641

[22] Filed: Sep. 30, 1993

[30] Foreign Application Priority Data

Oct. 10, 1992 [DE] Germany ............................ 4234222

[51] Int. Cl.$^6$ ................................................ C09D 11/02
[52] U.S. Cl. ................................ 106/22 R; 106/22 H; 568/76
[58] Field of Search ............... 106/22 R, 22 H; 8/650, 8/651, 652; 568/76

[56] References Cited

U.S. PATENT DOCUMENTS 4,343,653 8/1982 Beach et al. ................ 106/22 R
5,053,078 10/1991 Koike et al. ................ 106/22 R

FOREIGN PATENT DOCUMENTS 0063208 10/1982 European Pat. Off. .
0274216 7/1988 European Pat. Off. .

*Primary Examiner*—Helene Klemanski
*Attorney, Agent, or Firm*—Connolly & Hutz

[57] ABSTRACT

The black water-soluble sulphur dyes of the formula

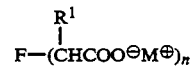

in which, for example,
F is the dye chromophore of C.I. Leuco Sulphur Black 1,
$R^1$ if hydrogen, alkyl,
$M^\oplus$ is an alkali metal cation and
n is such a large number that the dye contains 5 to 20% by weight of $COO^\ominus$ groups are, inter alia, outstandingly suitable for producing recording fluids.

20 Claims, No Drawings

WATER-SOLUBLE SULPHUR DYES, THEIR PREPARATION AND USE

The present invention relates to black water-soluble sulphur dyes of the formula I $$F\text{—}(\overset{R^1}{\underset{|}{C}}HCOO^{\ominus}M^{\oplus})_n \quad (I)$$

in which
F is the dye chromophore of C.I. Sulphur or Leuco Sulphur Black 1, C.I. No. 53185; C.I. Sulphur or Leuco Sulphur Black 2, C.I. No. 53195; D.I. Sulphur or Leuco Sulphur Black 5, C.I. No. 53205; C.I. Sulphur Black 6, C.I. No. 53295; C.I. Sulphur Black 7, C.I. No. 53300; C.I. Sulphur or Leuco Sulphur Black 10, C.I. No. 53190; C.I. Sulphur Black 11, C.I. 53290, or C.I. Sulphur or Leuco Sulphur Black 12, C.I. No. 53200,
$R^1$ is hydrogen or ($C_1$-$C_4$)-alkyl,
$M\oplus$ is an alkali metal cation and/or an ammonium cation of the formula II $$\left[\begin{array}{c} R^2 \\ | \\ H\text{—}N\text{—}R^3 \\ | \\ R^4 \end{array}\right]^{\oplus} \quad (II)$$

$R^2$, $R^3$, $R^4$ are hydrogen, ($C_1$-$C_4$)alkyl, ($C_2$-$C_4$)alkenyl, 2-hydroxypropyl, 3-hydroxypropyl, 2,3-dihydroxypropyl, —($CH_2CH_2NH$)$_p$—$CH_2CH_2NH_2$, —($CH_2CH_2O$)$_m$—$R^5$, 2-aminoethyl, 2-aminopropyl, 3-aminopropyl, or
 2 or 3 of the radicals $R^2$, $R^3$, $R^4$ together with the nitrogen atom to which they are attached form a heterocyclic ring which additionally may also contain further heteroatoms or heteroatom groupings,
$R^5$ is hydrogen or ($C_1$-$C_4$)alkyl,
p is a number from 1 to 10,
m is a number from 1 to 10 and
n is such a large number that dye I contains 5 to 20% by weight of $COO^{\ominus}$ groups.

The invention also relates to a process for preparing the sulphur dyes of the formula I according to the invention and to their use and to a recording fluid.

The radicals $R^1$ to $R^5$ can be identical or different. The alkyl radicals representing $R^1$ to $R^5$ and the alkenyl radicals representing $R^2$ to $R^4$ can be straight-chain or branched.

Preferred alkyl radicals for $R^1$ are methyl and ethyl.

Suitable alkali metal cations for $M\oplus$ are in particular $Li\oplus$, $Na\oplus$ and $K\oplus$, particularly preferably $Na\oplus$. In a dye I according to the invention, $M\oplus$ can be a single cation from the series of alkali metal cations or be the ammonium cation of the formula II or else be a mixture of these cations. In a dye according to the invention of the formula I, various ammonium cations of the formula II and/or various radicals $R^1$ can also be present.

If in the cation of the formula II one of the radicals $R^2$, $R^3$ or $R^4$ is hydrogen and the other two radicals are alkyl, both alkyl radicals are preferably methyl and ethyl.

If 2 or 3 of the radicals $R^2$ to $R^4$ together with the nitrogen atom to which they are attached form a heterocyclic ring, the heterocyclic ring can be saturated, unsaturated or aromatic and can additionally also contain, apart from the atom X, other heteroatoms, such as, for example, —O—, —N= or heteroatom groupings, such as —NH—, —N(alkyl), in particular —N($C_1$-$C_4$-alkyl)—, and a fused-on ring. The heterocyclic ring is in particular a 5- or 6-membered ring, containing, if desired, a fused-on aromatic 6-membered ring.

Preferred dyes according to the invention of the formula I have a —$COO^{\ominus}$ group content of 7 to 15% by weight.

Particularly preferred dyes according to the invention of the formula I contain the dye chromophore of C.I. Leuco Sulphur Black 1 as F.

The dyes according to the invention of the general formula I, which may contain uniform or mixed cations of the type mentioned, can be prepared by reacting a sulphur dye of the formula III in which $F^{\ominus}$ is the dye chromophore of C.I. Sulphur Black 1, 2, 5, 6, 7, 10, 11 or 12 in the leuco form in an alkaline medium with an α-halocarboxylic acid of the formula IV or the alkali metal salt thereof, as a result of which the following reaction takes place.:

$$F^{\ominus}Y^{\oplus} + nX\text{—}\overset{R^1}{\underset{|}{C}}H\text{—}COOH \xrightarrow[-nX]{} F\text{—}(\overset{R^1}{\underset{|}{C}}HCOO^{\ominus}Y^{\oplus})_n \quad (I)$$
$$(III) \qquad (IV) \qquad\qquad (Ia)$$

In this equation, $Y^{\ominus}$ is an alkali metal cation, preferably Na,
X is chlorine or bromine and
$R^1$ and n have the meanings already mentioned.

The reaction is usually carried out in aqueous medium at pH values of 7 to 14, preferably 9 to 11, and temperatures of 30° to 120° C., preferably 40° to 100° C.

A mixture of different dyes of the formula III and/or a mixture of different α-halocarboxylic acids of the formula IV and/or alkali metal salts thereof can also be used in the reaction.

The leuco dyes of the formula III are known. The leuco sulphur dye C.I. Leuco Sulphur Black 1, C.I. No. 53185 is synthesized by refluxing 2,4-dinitrophenol or its sodium salt (which can be prepared in situ by alkaline hydrolysis of 1-chloro-2,4-dinitrobenzene (together with, for example, sodium polysulphide in aqueous solution at 110° to 120° C. for 48 to 72 hours (see, for example, Colour Index, Third Edition, Volume 4 (1971), p. 4485, and the references cited there).

The leuco sulphur dyes
C.I. Leuco Sulphur Black 2, C.I. No. 53195,
C.I. Leuco Sulphur Black 5, C.I. No. 53205,
C.I. Leuco Sulphur Black 10, C.I. No. 53190 and
C.I. Leuco Sulphur Black 12, C.I. No. 53200
are prepared similarly to C.I. Leuco Sulphur Black 1. In these reactions, the following compounds are used instead of 2,4-dinitrophenol:
 for C.I. Leuco Sulphur Black 2: a mixture of 2,4-dinitrophenol with picric acid or picramic acid;
 for C.I. Leuco Sulphur Black 5: picric acid or picramic acid;
 for C.I. Leuco Sulphur Black 10; a mixture of 2,4-dinitrophenol and p-aminophenol;
 for C.I. Leuco Sulphur Black 12: a mixture of 2,4-dinitrophenol and p-(2,4-dinitroanilino)phenol,
(see, for example, Colour Index, loc.cit. pages 4485 and 4486, and the references cited there).

C.I. Leuco Sulphur Black 11, C.I. No. 53290, is prepared by refluxing 4-(2-naphthylamino)-phenol in the presence of small amounts of phenol and 4,4'-iminodiphenol in a solution of sodium polysulphide in butanol at 108° C. for 30 hours (see, for example, Colour Index loc.cit., p. 4490, and the references cited there, in particular Bios Final Report No. 983, p. 59, 117–129). C.I. Leuco Sulphur Black 6, C.I. No. 53295, C.I. Leuco Sulphur Black 7, C.I. No. 53300 are prepared similarly using, in addition to 4-(2-naphthylamino)-phenol small amounts of p-nitrophenol and 2,4-diaminotoluene in the case of C.I. Leuco Sulphur Black 6 and small amounts of 4-(3-carbazolylamino)-phenol and p-nitrophenol in the case of C.I. Leuco Sulphur Black 7 (see Colour Index loc.cit., p. 4491 and 4490, and the references cited there).

However, the leuco sulphur dyes of the formula III required as starting materials for preparing the sulphur dyes I according to the invention can also be prepared from the sulphur dyes C.I. Sulphur Black 1, C.I. No. 53185, C.I. Sulphur Black 2, C.I. No. 53195, C.I. Sulphur Black 5, C.I. No. 53205, C.I. Sulphur Black 6, C.I. No. 53295, C.I. Sulphur Black 7, C.I. No. 53300, C.I. Sulphur Black 10, C.I. No. 53190, C.I. Sulphur Black 11, C.I. No. 52290, C.I. Sulphur Black 12, C.I. No. 53200 by a reaction known per se with reducing agents, such as, for example, Na$_2$S and/or NaHS, and/or sodium formaldehydesulphoxylate and/or sodium dithionite and/or glucose.

C.I. Leuco Sulphur Black 1 can also be obtained from C.I. Solubilized Sulphur Black 1, C.I. No. 53186, by reaction with reducing agents (see, for example, Rev. Pure Appl. Chem. 12, 72 (1962)).

If the leuco sulphur dyes of the formula III required as starting materials are prepared by reduction of the corresponding sulphur dyes, the reaction (1) can also be carried out simultaneously with the reduction.

The structure of the leuco sulphur dyes of the formula III is not yet known in detail. They are believed to be a mixture of different dyes. For C.I. Leuco Sulphur Black 1, structures VI and VII (K. Venkataraman "The Chemistry of Synthetic Dyes", Vol. II, p. 1090, (1952)) and VIII (F. Gordon and P. Gregory "Organic Chemistry in Color", p. 16, Springer Verlag (1983)) have been proposed:

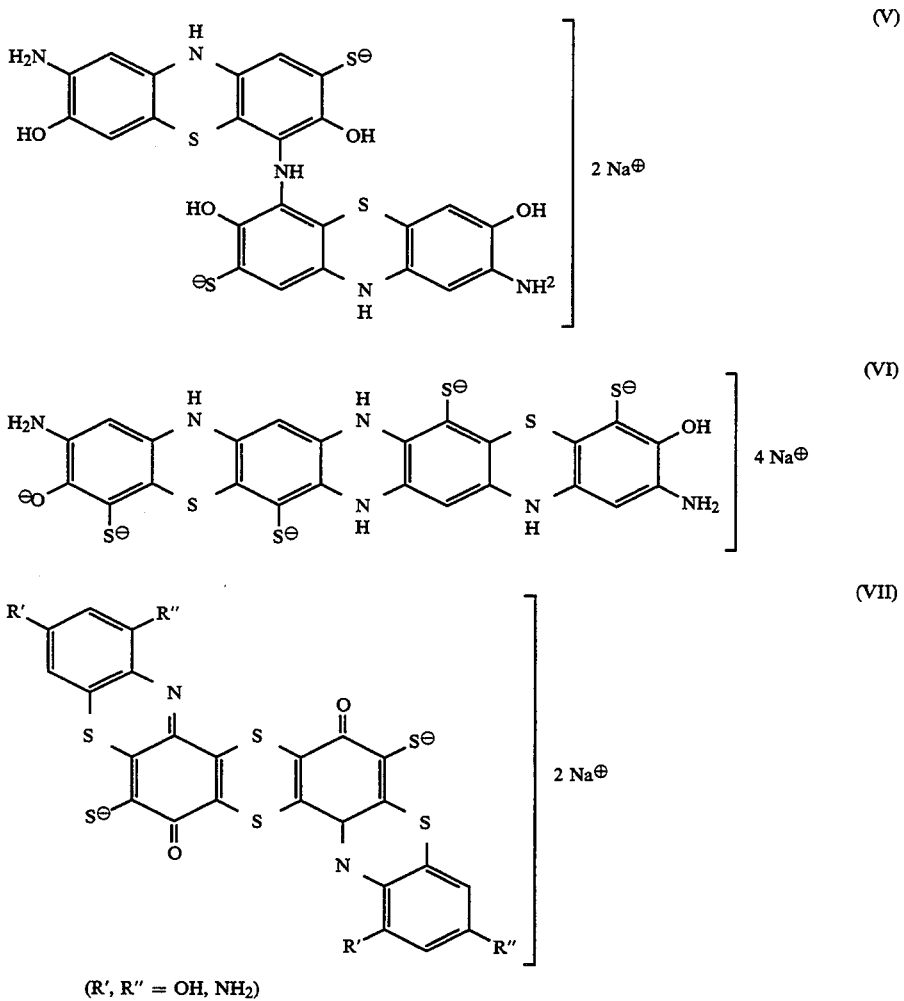

The reaction mixture formed in the synthesis of the leuco sulphur dyes can be used, if appropriate after dilution with water, directly for the synthesis of the dyes according to the invention according to (1).

Preferred α-halocarboxylic acids of the formula IV are: α-chloro- or α-bromoacetic acid, α-chloro- or α-bromopropionic acid and α-chloro- or α-bromobutyric acid. The α-halocarboxylic acids can also be used in the form of their alkali metal salts, in particular their sodium salts.

Since the leuco sulphur dyes to be used of the formula III can often be prepared directly from the organic starting materials, such as 2,4-dinitrophenol, it is convenient to raise the amount of α-halocarboxylic acid of the formula IV or the alkali metal salt thereof to be used in the reaction (1) on the starting material of the leuco sulphur dye, such as, for example, 2,4-dinitrochlorobenzene. Based on 1 mol of this organic starting material used for the synthesis of the leuco sulphur dye of the formula III, which may also be a mixture of different organic compounds, or based on 1 part by weight of the leuco sulphur dye of the formula III, the amount used of the α-halocarboxylic acid or the alkali metal salt thereof can be varied within wide limits ranging, for example, from 0.4 to 2 mol of α-halocarboxylic acid or the alkali metal salt thereof, preferably 0.5 to 1.5 mol, and very particularly preferably 0.6 to 1.3 mol.

The dyes according to the invention are usually formed in the synthesis as alkali metal salts, preferably as sodium salts of the formula Ia in an aqueous solution which additionally contains salts, such as chlorides, sulphates, sulphites or thiosulphates, in particular sodium chloride, sodium sulphate, sodium sulphite or sodium thiosulphate, resulting from the preparation.

To prepare dyes of the formula Ia in salt-free form, these salts can be removed by dialysis or membrane filtration, and the salt-free dyes can be isolated from the desalted aqueous solutions in the usual manner.

An alternative method is to precipitate the dyes according to the invention from the initially obtained aqueous solutions of the alkali metal salts of the formula Ia as sparingly soluble dye acids of the formula Ib

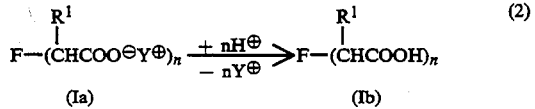

by adjusting the pH to a value of 0 to 5, preferably 2 to 4, followed by separation and isolation in a manner known per se, for example by filtration. The pH adjustment can be effected by means of a suitable acid, for example by means of a mineral acid, such as hydrochloric acid, sulphuric acid or phosphoric acid.

Since the dye acids of the formula Ib are sparingly soluble, the abovementioned inorganic salts can be easily removed and the products Ib obtained in salt-free form. The dyes according to the invention of the formula I can be obtained by subsequent reaction of the dye acids of the formula Ib with an alkali metal hydroxide and/or alkali metal carbonate and/or alkali metal bicarbonate and/or an amine of the formula VIII

This reaction constitutes a neutralization and is usually carried out in water.

The alkali metal hydroxides, alkali metal carbonates or alkali metal bicarbonates used are in particular the hydroxides, carbonates or bicarbonates of lithium, sodium or potassium. For neutralization, it is also possible to use mixtures of different hydroxides, carbonates, bicarbonates and/or amines of the formula VIII. This makes it possible to vary widely the cations $M^\ominus$ contained in the dyes according to the invention of the formula I.

Examples of suitable amines of the formula VIII are: ammonia, methylamine, ethylamine, propylamine, isopropylamine, n-butylamine; isobutylamine, sec-butylamine, tert-butylamine, dimethylamine, diethylamine, dipropylamine, diisopropylamine, trimethylamine, triethylamine, ethanolamine, diethanolamine, triethanolamine, allylamine, diemthylaminoethylamine, diethylaminopropylamine, (dibutyl)(2-hydroxyethyl)amine, ethylenediamine, 1,2-diaminopropane, 1,3-diaminopropane, 1-amino-2-hydroxypropane, 1-amino-2,3-dihydroxypropane, 1-dimethylamino-2,3-dihydroxypropane, diethylenetriamine, triethylenetetramine, pyridine, pyrrolidine, N-methylpyrrolidine, N-hydroxyethylpyrrolidine, piperidine, N-hydroxyethylpiperidine, morpholine, N-hydroxyethylmorpholine.

In the case where F in the formula Ia is the dye chromophore or C.I. Leuco Sulphur Black 6, 7 or 11, the reaction (1) gives greenish or dark-green solutions of the compounds Ia in which the dye chromophore F present in the leuco form has to be converted into the black dye chromophore of C.I. Sulphur Black 6, 7 or 11 by oxidation in a manner known per se. Suitable oxidizing agents for this oxidation are, for example, all those which are known from the preparation of sulphur dyes or dyeing with sulphur dyes to convert a sulphur dye from the leuco form into the actual dye form, such as, for example, bromine, iodine, sodium chlorite, sodium bromate in weakly acidic solution catalyzed by vanadate, but preferably hydrogen peroxide in acidic or, preferably, alkaline aqueous phase. Such a conversion of the chromophore of the leuco form into the actual dye form is not necessary in the case where F in compounds Ia is the dye chromophore of C.I. Leuco Sulphur Black 1, 2, 5, 10 or 12 but can, if desired, be carried out. The preferred oxidation with hydrogen peroxide in aqueous phase is advantageously carried out at standard temperature or only slightly elevated temperature. It is also possible to delay the oxidation to be carried out in the case of dye chromophores C.I. Leuco Sulphur Black 6, 7 and 11 and to be carried out, if desired, in the case of the other dye chromophores until after desalting by dialysis or membrane filtration or after precipitation of dye acid Ib and its subsequent neutralization to give dye I.

The black dyes according to the invention of the formula I have very good solubility in water and exhibit excellent light fastness and water fastness. Accordingly, they are suitable in particular for dyeing and printing cotton, polyamide, paper, leather and wood by the customary methods and produce black dyeings and prints.

The dyes according to the invention of the formula I are suitable in particular for the production of writing inks and recording fluids, in particular for the ink-jet printing method.

The ink-jet printing method and the demands made on the inks and recording fluids used in this method are described, for example, in: Kirk-Othmer, Encyclopedia of Chemical Technology, 3rd Ed., Vol. 20 (1982), 153–156, and in Ullmann's Encyclopedia of Industrial Chemistry, 5th Ed., Vol. A 13 (1989), 588–594.

The inks and recording fluids preparable by means of the dyes according to the invention of the formula I have excellent storage stability even in concentrated form and excellent printing properties, in particular good response and ejection behaviour, good droplet formation and excellent image properties, in particular with respect to density, hue, contrast, water fastness, light fastness and weather fastness.

An ink for the ink-jet printing method consists of an aqueous solution of one or more dyes of the general formula I. The ink can also contain one or more water-miscible solvents. Suitable water-miscible solvents of this type are in particular ($C_1$–$C_4$)alkanols, such as, for example, methanol, ethanol, propanol, isopropanol, butanol, sec.-butanol; amides, such as, for example, dimethylformamide and dimethylacetamide; ketones or ketone alcohols, such as, for example, acetone or diacetone alcohol; furthermore glycols and glycol ethers, such as, for example, ethylene glycol, diethylene glycol, triethylene glycol, polyethylene glycol. The ink can additionally also contain one or more other dyes. The ink can additionally also contain one or more auxiliaries, such as, for example, biocides, conducting salts or agents for adjusting the electric resistance, such as, for example, lithium chloride, sodium chloride, sodium sulphate, ammonium chloride, corrosion inhibitors, thickeners or agents for influencing the viscosity, such as, for example, cellulose derivatives, polyvinyl alcohol or water-soluble resins, surface-active agents, such as, for example, cationic, anionic or nonionic surfactants, such as, for example, diethanolamine or triethanolamine, agents for adjusting the pH, in particular buffers, humectants, and the like.

The amount of the dyes according to the invention of the formula I in the ink depends on the desired optical density of the image. As a rule, the ink contains 0.5 to 20% by weight, preferably 0.5 to 15% by weight, of one or more water-soluble sulphur dyes of the formula I. In general, the ink contains, apart from the dye and the auxiliaries, if present, 10 to 95% by weight of water and 0 to 70% by weight, preferably 0.5 to 70% by weight, of one or more water-miscible solvents.

To prepare the inks or recording fluids, a dye according to the invention of the formula I, in particular a dye according to the invention prepared from C.I. Leuco Sulphur Black 1 and preferably having a —COO$\ominus$ group content of 7 to 15% by weight, can be dissolved in water and then, if desired, the other components, solvents, auxiliaries and the like can be added, and the resulting mixture can then be filtered. The aqueous solutions of the dyes I according to the invention formed during neutralization of the dye acids Ib can be used, if appropriate after addition of further solvents and/or auxiliaries and/or dyes and filtration, directly as inks or recording fluids.

EXAMPLE 1

500 ml of water are added to 769.4 g of a 25% strength solution of C.I. Leuco Sulphur Black 1 prepared in a known manner from 202.6 g of 2,4-dinitrochlorobenzene (see, for example, Fierz-David, Blangey: Grundlegende Operationen der Farbenchemie, 8th edition, (1952), 329–30), and a solution of 145.6 g of sodium monochloroacetate in 700 ml of water is added at 60° C. The mixture is stirred at 60° C. for 2 hours, and 159.0 g of 32% strength aqueous hydrochloric acid are added until a pH of 2 is reached in order to precipitate the dye acid. The precipitated dye acid is isolated by filtration and washed with 3 l of water until free of salts. The product is stirred in 1750 ml of deionized water, and the resulting mixture is brought to a pH of 8 with 68 mol of 10N sodium hydroxide solution. The salt-free dye solution obtained is dried at 100° C. to constant weight.

Yield: 242.6 g of a black powder, readily soluble in water.

Absorption spectrum in water: $\lambda_{max}$: 610 nm.

COO$\ominus$ content: 10.5% by weight

EXAMPLE 2

The procedure of Example 1 is repeated, except that a solution of 87.4 g of sodium monochloroacetate in 400 ml of water is used instead of a solution of 145.6 g of sodium monochloroacetate in 700 ml of water, giving 227.3 g of a black powder which is likewise readily soluble in water.

Absorption spectrum in water: $\lambda_{max}$: 615 nm.

COO$\ominus$ content: 8.3% by weight

EXAMPLE 3

The process described in Example 1 is repeated with a solution of 174.8 g of sodium monochloroacetate in 800 ml of water (instead of 145.6 g of sodium monochloroacetate in 700 ml of water).

Yield: 252.6 g of a black powder, readily soluble in water.

Absorption spectrum in water: $\lambda_{max}$: 615 nm.

COO$\ominus$ content: 13.7% by weight

EXAMPLE 4

The process represented in Example 1 is repeated, using a solution of 163.1 g of sodium α-chloropropionate in 800 ml of water instead of a solution of 145.6 g of sodium monochloroacetate in 700 ml of water.

This gives 263.1 of a black powder readily soluble in water.

Absorption spectrum in water: $\lambda_{max}$: 605 nm.

COO$\ominus$ content: 9.9% by weight

Further dyes according to the invention of the general formula I which can be prepared by the procedure of Example 1 are shown in the table below, in which the alkali metal hydroxide or amine of the formula VIII used for neutralizing the dye acids is listed in column 2.

| Example | Alkali metal hydroxide or amine of the formula VIII |
| --- | --- |
| 5 | Lithium hydroxide |
| 6 | Potassium hydroxide |
| 7 | Ammonia |
| 8 | Ammonia/sodium hydroxide (1:1) |
| 9 | Ethanolamine |
| 10 | Diethanolamine |
| 11 | Triethanolamine |
| 12 | Methylamine |
| 13 | Dimethylethanolamine |
| 14 | Dimethylaminoethoxyethanol [(CH$_3$)$_2$NCH$_2$CH$_2$OCH$_2$CH$_2$OH] |
| 15 | Isopropylamine |
| 16 | Butylamine |
| 17 | Dibutylethanolamine |
| 18 | 1-Dimethylamino-2,3-dihydroxypropane [(CH$_3$)$_2$NCH$_2$CHOHCH$_2$OH] |
| 19 | Pyridine |
| 20 | Pyrrolidine |
| 21 | N-Hydroxyethylpyrrolidine |
| 22 | Piperidine |
| 23 | N-Hydroxyethylpiperidine |
| 24 | Morpholine |
| 25 | N-Hydroxyethylmorpholine |
| 26 | Triethylenetetramine |

EXAMPLE 27

Recording fluids for the ink-jet method can be produced by the following recipe:
Dye of the formula I: 5–15% by weight
n-Propanol: 5–10% by weight
Diethylene glycol: 10–10% by weight
Water: to 100% by weight The dye is dissolved in water, n-propanol and diethylene glycol are mixed into the solution, and the resulting mixture is made up to 100% by weight with water and filtered.

EXAMPLE 28

The procedure of Example 1 is repeated, and 43.0 g of 35% strength hydrogen peroxide are added to the dye solution obtained by neutralization of the dye acid formed with 68 ml of 10N sodium hydroxide solution in 1750 ml of deionized water. Stirring at 25° to 30° C. is continued for 6 hours, during which an increase in viscosity and a lowering of the pH from 8 to 6.4 is observed.

The dye solution is then dried to constant weight at 80° C. in vacuo.
Yield: 225.1 g of a black powder
Absorption spectrum in water: $\lambda_{max}$: 590 nm.
$COO^\ominus$ content: 10.6% by weight.

EXAMPLE 29

104 g of C.I. Sulphur Black 11 (for preparation see Colour Index, Vol. 4, 3rd edition (1971); Bios Final Report No. 983, p. 59, 117–129) are suspended in 1 l of water, and 144 ml of 10N sodium hydroxide solution and 62.4 g of 60% strength sodium sulphide are added. The reaction mixture is then stirred at 95° to 100° C. for 2 hours. A solution of 120.8 g of sodium monochloroacetate in 250 ml of water is then added, and the mixture is stirred at 60° C. for 2 hours. Precipitation of the dye acid is effected by addition of 212 g of 30% strength hydrochloric acid until a pH of 3 is reached. The precipitated dye acid is filtered off and washed with 2 l of water until free of salt. The press cake obtained is introduced into 800 ml of water, and the resulting mixture is brought to a pH of 7.5 with 16 ml of 10N sodium hydroxide solution. 20 g of 35% strength hydrogen peroxide are then added to the dark-green solution, stirring is continued for 2 hours, and the resulting black dye solution is dried at 80° C. in vacuo.
Yield: 96.8 g of a black powder
Absorption spectrum in water: $\lambda_{max}$: 570 nm.
$COO^\ominus$ content: 7.4% by weight.

We claim:

1. Water-soluble black sulphur dyes of the formula I

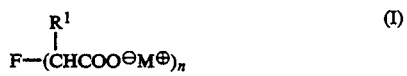

in which
F is the dye chromophore of C.I. Sulphur or Leuco Sulphur Black 1, C.I. No. 53185; C.I. Sulphur or Leuco Sulphur Black 2, C.I. No. 53195; C.I. Sulphur or Leuco Sulphur Black 5, C.I. No. 53205; C.I. Sulphur Black 6, C.I. No. 53295; C.I. Sulphur Black 7, C.I. No. 53300; C.I. Sulphur or Leuco Sulphur Black 10, C.I. No. 53190; C.I. Sulphur Black 11, C.I. No. 53290, or C.I. Sulphur or Leuco Sulphur Black 12, C.I. 53200, $R^1$ is hydrogen or $(C_1-C_4-)$ alkyl, $M^\oplus$ is an alkali metal cation, an ammonium cation of the formula II or mixtures thereof,

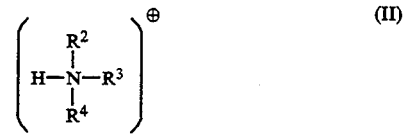

$R^2$, $R^3$, $R^4$ are hydrogen, $(C_1-C_4)$ alkyl, $(C_2-C_4)$ alkenyl, 2-hydroxypropyl, 3-hydroxypropyl, 2,3-dihydroxypropyl, —$(CH_2CH_2N$—$H)_p$—$CH_2CH_2NH_2$, —$(CH_2CH_2O)_m$—$R^5$,2-aminoethyl,2-aminopropyl,3-aminopropyl, or 2 or 3 of the radicals $R^2$, $R^3$, $R^4$ together with the nitrogen atom to which they are attached form a heterocyclic ring which optionally contain further heteroatoms or heteroatom groupings, $R^5$ is hydrogen or $(C_1-C_4)$ alkyl, p is a number from 1 to 10, m is a number from 1 to 10 and n is such a large number that dye I contains 5 to 20% by weight of $COO^\ominus$ groups.

2. Water-soluble sulphur dyes according to claim 1, wherein said dyes are from the dye chromophore of C.I. Leuco Sulphur Black 1.

3. Water-soluble sulphur dyes according to claim 1, wherein 7 to 15% by weight of carboxyl groups are present in the dye molecule.

4. Process for preparing the sulphur dyes of claim 1, comprising reaction a sulphur dye of the formula III

in which
F is the dye chromophore of C.I. Leuco Sulphur Black 1, 2, 5, 6, 7, 10, 11, or 12 and
Y is an alkali metal cation with an α-halocarboxylic acid of the formula IV

in which
$R^1$ is hydrogen or $(C_1-C_4)$ alkyl or an alkali metal salt thereof and optionally the resulting dye of the formula Ia

is desalted by dialysis membrane filtration or is adjusted to a pH of about 0 to about 5 in aqueous solution, and the dye acids of the formula Ib

precipitating during the pH adjustment are separated off and reacting with an alkali metal hydroxide, alkali metal carbonate, alkali metal bicarbonate, or an amine of the formula VII

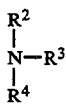

or a mixture thereof,
in which
- $R^2$, $R^3$ and $R^4$ are hydrogen, $(C_1-C_4)$alkyl, $(C_2-C_4)$alkenyl, 2-hydroxypropyl, 3-hydroxypropyl, 2,3-dihydroxypropyl, $-(CH_2CH_2NH-)_p-CH_2CH_2NH_2$, $-(CH_2CH_2O)_m-R^5$, 2-aminoethyl, 2-aminopropyl, 3-aminopropyl, or
- 2 or 3 of the radicals $R^2$, $R^3$, $R^4$ together with the nitrogen atom to which they are attached forma heterocyclic ring which optionally containing further heteroatoms or heteroatom groupings,
- $R^5$ is hydrogen or $(C_1-C_4)$alkyl,
- p is a number from 1 to 10,
- m is a number from 1 to 10 to give a dye of the formula I, the dye Ia or the dye I obtained after precipitation of the dye acid Ib, followed by reaction with an alkali metal hydroxide, alkali metal carbonate, alkali metal bicarbonate, and amine of the formula VIII or mixtures thereof, in the case where F in formula Ia is the dye chromophore of C.I. Leuco Sulphur Black 6, 7 or 11, being oxidized or the dye Ia or the dye I, in the case where F in formula Ia is the dye chromophore of C.I. Leuco Sulphur Black 1, 2, 5, 10 or 12 optionally, oxidized.

5. Process according to claim 4, wherein the dye C.I. Leuco Sulphur Black 1, C.I. No. 53185, is used.

6. A process of dyeing comprising contacting the water-soluble sulphur dyes of the formula I of claim 1 on a material surface.

7. The process as claimed in claim 6, wherein said material is selected from the group consisting of cotton, polyamide, paper, wood, and leather.

8. A recording fluid comprising the dye I of claim 1 in an aqueous solution.

9. Recording fluid according to claim 8, wherein said fluid contains 0.5 to 20% by weight, of a dye of the formula I.

10. Recording fluid according to claim 9, wherein said fluid contains 0.5 to 15% by weight of a dye of the formula I.

11. Process according to claim 4, wherein said process is adjusted to a pH of about 2 to about 4.

12. Water soluble sulphur dyes according to claim 1, wherein $R^1$ is methyl or ethyl.

13. Water soluble sulphur dyes according to claim 12, wherein $M^\oplus$ is $Li^\oplus$, $Na^\oplus$ or $K^\oplus$.

14. Water soluble sulphur dyes according to claim 13, wherein $M^\oplus$ is $Na^\oplus$.

15. Water soluble dyes according to claim 1, wherein one of the radicals $R^2$, $R^3$ or $R^4$, is hydrogen and the other two radicals are alkyl, wherein said alkyl is either methyl or ethyl.

16. The process according to claim 4, wherein the reaction is carried out in an aqueous medium at a pH value of about 7 to about 14 and a temperature of about 30° to about 120° C.

17. The process according to claim 15, wherein the reaction is carried out at a pH value of about 9 to about 11 and a temperature range of about 40° to about 100° C.

18. The process according to claim 4 wherein the alkyl metal salts are sodium salts.

19. The process according to claim 4 wherein the amines of Formula VIII are selected from the group consisting of ammonia, methylamine, ethylamine, propylamine, isopropylamine, n-butylamine; isobutylamine, sec-butylamine, tert-butylamine, dimethylamine, diethylamine, dipropylaimine, diisopropylamine, trimethylamine, triethylamine, ethanolamine, diethanolamine, triethanolamine, allylamine, dimethylaminoethylamine, diethylaminopropylamine, (dibutyl) (2-hydroxyethyl) amine, ethylenediamine, 1,2-diaminopropane, 1,3-diaminopropane, 1-amino-2-hydroxypropane, 1-amino-2,3-dihydroxypropane, 1-dimethylamine-2,3-dihydroxypropane, diethylenetriamine, triethylenetetramine, pyridine, pyrrolidine, N-methylpyrrolidine, N-hydroxyethylpyrrolidine, piperidine, N-hydroxyethylpiperidine, morpholine and N-hydroxyethylmorpholine.

20. An ink comprising an aqueous solution of one or more dyes as claimed in claim 1.

* * * * *